United States Patent [19]

Gupta

[11] Patent Number: 4,973,392
[45] Date of Patent: Nov. 27, 1990

[54] CURABLE COATING COMPOSITIONS COMPRISING CROSSLINKED COMPONENTS

[75] Inventor: Goutam Gupta, Homewood, Ill.

[73] Assignee: The Sherwin-Williams Company, Cleveland, Ohio

[21] Appl. No.: 290,213

[22] Filed: Dec. 27, 1988

[51] Int. Cl.$^5$ .............................................. C25D 13/06
[52] U.S. Cl. ........................... 204/181.7; 525/328.8; 525/454; 525/450; 528/287; 528/288; 528/293; 528/295; 524/901; 523/412; 523/413
[58] Field of Search .................... 204/181.7; 523/412, 523/413; 524/901; 525/328.8, 454, 450; 528/287, 288, 293, 295

[56] References Cited

U.S. PATENT DOCUMENTS

| | | | |
|---|---|---|---|
| 4,405,662 | 9/1983 | Raudenbusch et al. | 427/386 |
| 4,423,167 | 12/1983 | Valko | 523/414 |
| 4,423,169 | 12/1983 | Valko | 523/414 |
| 4,427,805 | 1/1984 | Kooijmans et al. | 523/417 |
| 4,430,462 | 2/1984 | Jaeger | 204/181.7 |
| 4,440,612 | 4/1984 | Valko | 204/181 |
| 4,489,182 | 12/1984 | Valko | 523/414 |
| 4,491,611 | 1/1985 | Barnhoorn et al. | 427/386 |
| 4,511,447 | 4/1985 | Valko | 204/181 C |

FOREIGN PATENT DOCUMENTS 0012463  11/1979  European Pat. Off. .
2102430  2/1983  United Kingdom .

OTHER PUBLICATIONS

U.S. Ser. No. 07/290,620; filed 12-27-88; Gupta & Mels; Curable Coating Compositions Comprising Self-Crosslinkable Components.

*Primary Examiner*—John F. Niebling
*Assistant Examiner*—Ben C. Hsing
*Attorney, Agent, or Firm*—Steven W. Tan; Robert E. McDonald

[57] ABSTRACT

This invention relates to coating compositions which comprise a polymer having at least two hydroxy functional groups and a crosslinking agent having an average of at least two pendent ester groups of the general formula:

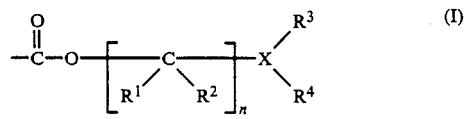

wherein $R^1$ and $R^2$ are independently hydrogen, alkyl, substituted alkyl or aryl groups; n is from about 1 to about 5; X is nitrogen, sulfur or phosphorus; and when X is either nitrogen or phosphorus, $R^3$ is hydrogen, lower alkyl, or an aryl group; $R^4$ is lower alkyl or an aryl group; and when X is sulfur, $R^4$ is nothing and $R^3$ is either hydrogen, lower alkyl or aryl.

20 Claims, No Drawings

CURABLE COATING COMPOSITIONS COMPRISING CROSSLINKED COMPONENTS

BACKGROUND OF THE INVENTION

1. Field of the Invention

This invention relates to coating compositions which comprise a polymer having at least two hydroxy functional groups and a crosslinking agent having an average of at least two pendent ester groups of the general formula:

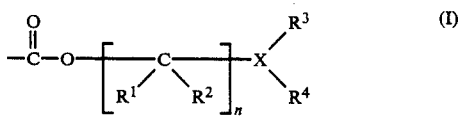

wherein $R^1$ and $R^2$ are independently hydrogen, alkyl, substituted alkyl or aryl groups; n is from about 1 to about 5; X is nitrogen, sulfur or phosphorus: and when X is either nitrogen or phosphorus, $R^3$ is hydrogen, lower alkyl, or an aryl group; $R^4$ is lower alkyl or an aryl group; and when X is sulfur, $R^4$ is nothing and $R^3$ is either hydrogen, lower alkyl or aryl.

2. Description of the Art

Methods of crosslinking hydroxy functional polymers and polymeric polyols with esters are known. For example, U.S. Pat. No. 4,423,167 teaches coating compositions formed by transesterifying a polymeric polyol with a polyester crosslinking agent having at least two beta-alkoxyester groups per molecule. Similarly, U.S. Pat. No. 4,440,612 teaches a method of coating a conductive substrate using the composition of U.S. Pat. No. 4,423,167. U.S. Pat. No. 4,489,182 teaches coating compositions formed by transesterifying a polymeric polyol with a polyester crosslinking agent having at least two gamma and/or deltahydroxyester groups per molecule. U.S. Pat. No. 4,511,447 teaches a method of coating a conductive substrate using the composition of U.S. Pat. No. 4,489,182. U.S. Pat. No. 4,423,169 teaches coating compositions formed by transesterifying a polymeric polyol with a polyester crosslinking agent having at least two beta-ester and/or gamma-ester ester groups per molecule. U.K. Patent Application No. GB 2 102 430 A teaches coating compositions formed by transesterifying a polymeric polyol with a polyester crosslinking agent having at least two ester groups containing a proximate substituent group per molecule, selected from the group consisting of beta-alkoxy, beta-carboxyalkyl, beta-amido, gamma-hydroxy, gamma-carboxyalkyl, and delta-hydroxy groups. European Patent Application No. 0 012 463 A1 teaches thermosetting resinous binders useful as coating compositions comprising a hydroxy-functional polymeric resin and a polyester crosslinking agent having at least two beta-hydroxy ester groups per molecule. U.S. Pat. No. 4,427,805 teaches thermosetting binder compositions comprising a hydroxy-functional polymeric resin and a polyester crosslinking agent having at least two beta-hydroxy ester groups per molecule. U.S. Pat. No. 4,491,611 teaches catalytically self-crosslinking resinous binders prepared by addition reaction of a primary amine to a beta-hydroxyalkyl ester of an alpha-beta-alkenylcarboxylic acid followed by reaction of this amine adduct with an epoxy resin to produce a resin having both hydroxy functionality and beta-hydroxyalkyl ester groups.

In each of the above prior art patents, the crosslinking mechanism is promoted by an activation of the reactive ester group. This is accomplished through an interaction of the ester carboxyl group with the available electron pair on the neighboring activating group, e.g., the oxygen atoms from the beta- or gamma-hydroxy or alkoxy group. The degree of activation is directly proportional to the degree of the availability of the electron pair, i.e. nucleophilicity, from the activating oxygen. The nucleophilicity of oxygen in the prior art is low compared to the nucleophilicity of nitrogen, sulfur or phosphorus, consequently, the magnitude of activation provided by oxygen is lower, and the result is the apparent need for higher crosslinking temperatures than those needed by the present invention.

The present invention relates to coating compositions formed by crosslinking a polymeric resin having at least two hydroxy functional groups with a polyester crosslinking agent having at least two ester groups per molecule of the general formula:

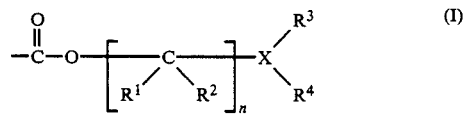

wherein $R^1$ and $R^2$ are independently hydrogen, alkyl, substituted alkyl or aryl groups; n is from about 1 to about 5; X is nitrogen, sulfur or phosphorus; and when X is nitrogen or phosphorus, $R^3$ is hydrogen, lower alkyl, or an aryl group; $R^4$ is lower alkyl or an aryl group; and when X is sulfur, $R^4$ is nothing and $R^3$ is either hydrogen, lower alkyl or aryl.

The crosslinked resins of the present invention are excellent thermosetting coating compositions, and are particularly useful in cathodic electrodeposition processes.

SUMMARY OF THE INVENTION

This invention relates to coating compositions formed by ester exchange between a polymer having at least two hydroxy functional groups and a polyester containing an average of at least two pendent ester groups of the general formula:

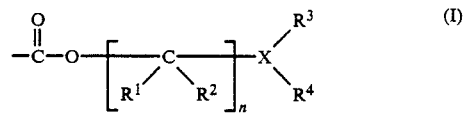

wherein $R^1$ and $R^2$ are independently hydrogen, alkyl, substituted alkyl or aryl groups; n is from about 1 to about 5; X is nitrogen, sulfur or phosphorus; and when X is nitrogen or phosphorus, $R^3$ is hydrogen, lower alkyl, or an aryl group; $R^4$ is lower alkyl or an aryl group; and when X is sulfur, $R^4$ is nothing and $R^3$ is either hydrogen, lower alkyl or aryl.

Accordingly, it is an object of this invention to provide novel coating compositions.

It is another object of this invention to provide coating compositions which can be heat cured.

It is another object of this invention to provide coating compositions which are particularly useful in cathodic electrodeposition processes.

These and other objects of this invention will be apparent from the detailed description which follows.

DETAILED DESCRIPTION OF THE INVENTION

Transesterification is the process whereby an ester and an alcohol exchange alkyl groups to form a new ester and a new alcohol. The general reaction is as follows:

$$RCOOR^1 + R^2OH \longleftrightarrow RCOOR^2 + R^1OH$$

The reaction has the potential to crosslink hydroxy functional polymeric resins. However, normal carboxylic esters do not have sufficient reactivity to undergo ester exchange with hydroxy functional compounds at temperatures low enough to be of interest in low bake cure systems. The concept of increasing the reactivity of a functional group through interaction with another strategically placed proximate group is well known and is generally referred to as "neighboring group participation". Normal unactivated carboxylic esters should be able to be transformed into esters with higher reactivity by using the neighboring group participation concept. The oxygen-containing esters, such as those described by the art above, all increase the reactivity of the ester group through interaction with a lone electron pair from oxygen. Each of those esters then possesses sufficient reactivity to transesterify with the specific hydroxy functional compounds disclosed at temperatures theoretically lower than those needed without such activation. If there are more than two activated ester groups per molecule, and if there are more than two hydroxy groups per molecule, the activated esters will tend to crosslink the hydroxy functional composition.

As stated above, the prior art patents promote the activation of the reactive ester through interaction with the activating oxygen's available electron pair. The present invention, however, promotes the activation of the reactive ester through interaction with atoms which are more nucleophilic than oxygen, namely nitrogen, sulfur and phosphorus. The advantage derived through this difference is that reactive esters with higher degrees of activation are obtained, and thus, crosslinking temperatures theoretically lower than those of the prior art are achievable.

Crosslinking Agents

The novel activated esters of the present invention will crosslink hydroxy functional resins to produce the novel heat curable resins of this invention. In the present invention, this is accomplished by replacing otherwise normal ester groups with an activated ester group containing either a nitrogen, a sulfur, or a phosphorus containing substituent group.

In general, the activated ester crosslinking agents of concern to this invention are short chain carboxylic esters having at least two pendent ester groups of the general formula:

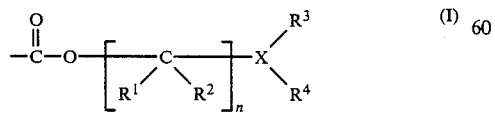  (I)

wherein $R^1$ and $R^2$ are independently hydrogen, alkyl, substituted alkyl or aryl groups, preferably hydrogen or methyl groups; n is from about 1 to about 5, preferably about 2; X is nitrogen, sulfur or phosphorus, preferably nitrogen; and when X is nitrogen or phosphorus, $R^3$ is hydrogen, lower alkyl, or an aryl group, preferably hydrogen, methyl, or an ethyl group; $R^4$ is lower alkyl or an aryl group, preferably methyl or an ethyl group; and when X is sulfur, $R^4$ is nothing and $R^3$ is hydrogen, lower alkyl or aryl, preferably hydrogen, methyl or ethyl.

One particularly preferred polyester crosslinking agent is di(dimethylaminoethyl) sebacate, which has the formula:

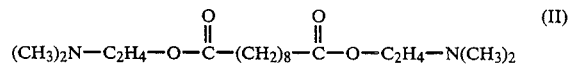  (II)

Though the process for producing di(dimethylaminoethyl) sebacate is not of import to this invention, it is generally formed by reacting dimethyl sebacate with N,N-dimethylethanolamine in the presence of a catalyst.

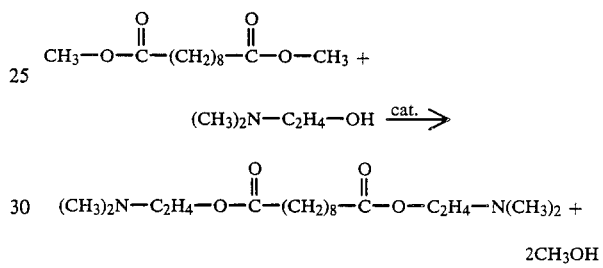

2CH₃OH

The di(dimethylaminoethyl) sebacate, when mixed and heated with a hydroxy functional polymeric resin, in the presence of a catalyst, reacts with the resin to undergo a typical transesterification reaction resulting in an exchange of the dimethyl amino ethanol esters from the sebacate molecule in favor of the hydroxy functional polymer. The alkoxy portion of the activated ester groups leave to form alcohols via reaction with the hydroxy groups from the polymer. In general, one unit of the resultant crosslinked material can be represented by the formula:

$$A—B—A \quad (III)$$

wherein A is the backbone of the hydroxy functional resin, and B is the backbone of the activated ester molecule connected to A through the newly formed ester group. A new alcohol of the general formula:

$$D—OH \quad (IV)$$

is formed where D is the alkyl group of the alkoxy component of the activated ester group.

When the activated ester molecule is di(dimethylaminoethyl) sebacate, the resultant crosslinked material can be represented by the following formula:

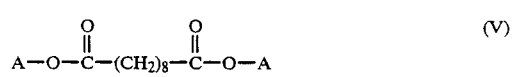  (V)

and the new alcohol can be represented by the formula:

$$(CH_3)_2N—C_2H_4—OH \quad (VI)$$

Di(dimethylaminoethyl) sebacate is not the only ester which can be used as the crosslinking agent. In addition to the sebacic acid backbone, other multi-carboxylic acid backbones are useful. Furthermore, for each carboxylic acid backbone, the activated ester group can be varied according to Formula I. Other preferred crosslinking agents are the succinates, malonates, adipates, glutarates, pimelates, undecanedioates, citrates, tetra- and hexa- hydrophthalates, phthalates, azaleates, bicyclo [2.2.1] heptane dicarboxylates, and the like.

The ratio of active ester functionality to the hydroxy functionality can vary between about 10:1 and 1:10 respectively; the preferred ratio generally between 4:1 and 1:4; with the most preferred ratio generally around 1:1.

Hydroxy Functional Compounds

The hydroxy functional compounds which are useful in the practice of this invention have an average of at least about two hydroxyl groups per molecule. Although low molecular weight diols and polyols such as propylene glycol, 1,6-hexanediol, triethanol amine, and pentaerythritol can be utilized in the practice of this invention, it is preferred to utilize polymeric hydroxy functional compounds such as polyethers, polyesters, acrylics, polyurethanes, polycaprolactones, and the like.

Preferably the hydroxy-functional polymer will have a number average molecular weight of at least about 400. Typical number average molecular weights will range from about 400 to about 30,000, and especially 1,000 to about 15,000. In order to provide the fastest rate of reaction during cure it is preferred in the practice of this invention to utilize hydroxy-functional compounds having predominantly, and preferably all, primary hydroxyl functionality.

Representative hydroxy-functional polymers include those described below:

Polyether polyols are well known in the art and are conveniently prepared by the reaction of a diol or polyol with the corresponding alkylene oxide. These materials are commercially available and may be prepared by a known process such as, for example, the processes described in *Encyclopedia of Chemical Technology*, Volume 7, pages 257–262, published by Interscience Publishers, Inc., 1951; and in Kirk-Othmer *Encyclopedia of Chemical Technology*, Volume 18, pages 638,641, published by Wiley-International, 1982. Representative examples include the polypropylene ether glycols and polyethylene ether glycols such as those marketed as Niax ® Polyols from Union Carbide Corporation.

Another useful class of hydroxy-functional polymers are those prepared by condensation polymerization reaction techniques as are well known in the art. Representative condensation polymerization reactions include polyesters prepared by the condensation of polyhydric alcohols and polycarboxylic acids or anhydrides, with or without the inclusion of drying oil, semi-drying oil, or non-drying oil fatty acids. By adjusting the stoichiometry of the alcohols and the acids while maintaining an excess of hydroxyl groups, hydroxy-functional polyesters can be readily produced to provide a wide range of desired molecular weights and performance characteristics.

The polyester polyols are derived from one or more aromatic and/or aliphatic polycarboxylic acids, the anhydrides thereof, and one or more aliphatic and/or aromatic polyols. The carboxylic acids include the saturated and unsaturated polycarboxylic acids and the derivatives thereof, such as maleic acid, fumaric acid, succinic acid, adipic acid, azelaic acid, and dicyclopentadiene dicarboxylic acid. The carboxylic acids also include the aromatic polycarboxylic acids, such as phthalic acid, isophthalic acid, terephthalic acid, etc. Anhydrides such as maleic anhydride, phthalic anhydride, trimellitic anhydride, or Nadic Methyl Anhydride (brand name for methylbicyclo[2.2.1]heptene-2,3-dicarboxylic anhydride isomers) can also be used.

Representative saturated and unsaturated polyols which can be reacted with the carboxylic acids to produce hydroxy-functional polyesters include diols such as ethylene glycol, dipropylene glycol, 2,2,4-trimethyl 1,3-pentanediol, neopentyl glycol, 1,2-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, trimethylolhexane, triethylolpropane, 1,2,4-butanetriol, glycerol, pentaerythritol, dipentaerythritol, etc.

Typically, the reaction between the polyols and the polycarboxylic acids is conducted at about 120° C. to about 200° C. in the presence of an esterification catalyst such as dibutyl tin oxide.

Additionally, hydroxy-functional polymers can be prepared by the ring opening reaction of epoxides and/or polyepoxides with primary or, preferably, secondary amines or polyamines to produce hydroxy-functional polymers. Representative amines and polyamines include ethanol amine, N-methylethanol amine, dimethyl amine, ethylene diamine, isophorone diamine, etc. Representative polyepoxides include those prepared by condensing a polyhydric alcohol or polyhydric phenol with an epihalohydrin, such as epichlorohydrin, usually under alkaline conditions. Some of these condensation products are available commercially under the designations EPON or DRH from Shell Chemical Company, and methods of preparation are representatively taught in U.S. Pat. Nos. 2,592,560; 2,582,985 and 2,694,694.

Other useful hydroxy-functional polymers can be prepared by the reaction of at least one polyol, such as those representatively described above, with polyisocyanates to produce hydroxy-functional urethanes. Representative polyisocyanates having two or more isocyanate groups per molecule include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyanatomethyl-3,5,5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4 ',4''-triisocyanate, 1,3,5-triisocyanate benzene and 2,4,6-triisocyanate toluene; and the tetraisocyanates such as 4,4'-diphenyl-dimethyl methane-2,2 '-5,5'-tetraisocyanate; the polymerized polyisocyanates such as tolylene diisocyanate dimers and trimers, and other various polyisocyanates containing biuret, urethane, and/or allophanate linkages. The polyisocyanates and the polyols are typically reacted at temperatures of 25° C. to about 150° C. to form the hydroxy-functional polymers.

Useful hydroxy-functional polymers can also be conveniently prepared by free radical polymerization techniques such as in the production of acrylic resins. The polymers are typically prepared by the addition polymerization of one or more monomers. At least one of the monomers will contain, or can be reacted to produce, a reactive hydroxyl group. Representative hydroxyfunctional monomers include 2-hydroxyethyl acrylate, 2-hydroxypropyl acrylate, 4-hydroxybutyl methacrylate, 2-hydroxypropyl methacrylate, 3-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, para-vinyl benzyl alcohol, etc. Typically the hydroxy-functional monomers would be copolymerized with one or more monomers having ethylenic unsaturation such as styrene, and methyl, ethyl, butyl, lauryl, isobornyl, 2-ethylhexyl acrylates and methacrylates, and the like.

The acrylics are conveniently prepared by conventional free radical addition polymerization techniques. Frequently, the polymerization will be catalyzed by conventional initiators known in the art to generate a free radical such as azobis(isobutyronitrile), cumene hydroperoxide, t-butyl perbenzoate, etc. Typically, the unsaturated monomers are heated in the presence of the free radical initiator at temperatures ranging from about 35° C. to about 200° C., and especially 100° C. to 160° C., to effect the polymerization. The molecular weight of the polymer can be controlled, if desired, by the monomer selection, reaction temperature and time, and/or the use of chain transfer agents as is well known in the art.

Especially preferred in the practice of this invention are hydroxy-functional polyesters and hydroxy-functional acrylic polymers. An especially preferred hydroxy-functional polymer is the addition polymerization reaction product of (a) 10 to about 40 weight percent of a hydroxy-functional ethylenically unsaturated monomer and (b) 60 to about 90 weight percent of at least one ethylenically unsaturated monomer copolymerizable with the hydroxy-functional monomer.

The resin composition is most preferably dissolved or dispersed in a suitable solvent. If the resin composition is a low viscosity liquid, it can be used as is or it can be diluted. If present as a higher viscosity liquid, or as a solid, the resin can be diluted or dissolved to a desired thickness.

Generally, for lacquer or conventional paint formulations, the resin composition is dissolved in organic solvent and applied to the substrate to be coated using conventional methods such as brush, roller, spraying, dipping, and the like.

Generally, for cathodic deposition applications, the resin composition is dispersed in an aqueous solvent. Suitable solvents include water, and water in combination with other water miscible solvents. The concentration of resin in the solvent depends largely on the process parameters to be used, and is in general not critical. In the case of cathodic electrodeposition, generally a major proportion of the aqueous composition will normally be solvent, e.g., the composition may contain from about 1 to about 75 percent, typically from about 1 to about 50 percent by weight solid with the remainder being solvent.

To make the resin more soluble in aqueous solutions, it will generally be necessary to partially or completely neutralize the resin with acid, preferably an organic acid, such as formic acid, acetic acid, citric acid or lactic acid. In general, the amount of acid needed is from about 20 percent to about 100 percent of the functionality due to the nitrogen, sulfur or phosphorus groups pendent to the chain.

In most instances, a pigment composition and, if desired, various additives such as catalysts, flow agents, dispersants, solvents, and other materials may be included in the coating composition. The pigment composition may be of any conventional type, comprising, for example, one or more pigments such as iron oxides, lead oxides, strontium chromate, carbon black, titanium dioxide, talc, barium sulfate, zinc oxide, cadmium yellow, cadmium red, chromic yellow and the like.

In electrodeposition processes employing the aqueous coating composition described herein, the aqueous composition is placed in contact with an electrically conductive anode and an electrically conductive cathode, with the surface to be coated being the cathode. Upon passage of electric current between the anode and the cathode, while in contact with the bath containing the coating composition, an adherent film of the coating composition is deposited on the cathode. The applied voltage may be varied greatly within the practice of this invention for electrodeposition and can be, for example, as low as 1 volt or as high as several thousand volts, although typically between 50 volts and 500 volts. The current density is usually between 1 ampere and 15 amperes per square foot, and tends to decrease during electrodeposition.

The electrodeposition method is applicable to the coating of any electrically conductive substrate, and especially metal such as steel, aluminum, copper, or surfaces which have been coated with conductive primers or filaments to impart a conductive surface.

After application by whatever means desired, the coating is cured at elevated temperatures by any convenient method such as in baking ovens or with banks of infared heat lamps. Curing temperatures are preferably from about 150° F. to about 450° F. although somewhat higher or lower temperatures can be employed if desired.

The transesterification reaction generally requires the presence of a catalyst. In normal transesterification reactions, the catalyst can be either acid or base. In the present invention, preferred catalysts are the salts and/or complexes of metals such as lead, zinc, iron, tin and manganese. These catalysts are known in the art and include 2-ethylhexonates, naphthanates, and acetyl acetonates. One particularly preferred transesterification catalyst is butyltin trishexanoate. The amount of catalyst generally varies from about 0.1 to about 2.0, preferably from about 0.2 to about 1.0 percent by weight based upon the total weight solids of the coating composition.

The following examples have been selected to illustrate specific embodiments and practices of advantage to a more complete understanding of the invention. Unless otherwise stated, "parts" means parts by weight.

EXAMPLE 1

Preparation of Di(dimethylaminoethyl) Sebacate:

Dimethyl sebacate (40.6 g, 0.1765 mole), N,N-dimethylethanolamine (31.4 g, 0.3530 mole), and butyltin trishexanoate (1.0 g, Trade name Fastcat 4102), were mixed under nitrogen and heated to 135° C., at which point methanol began to distill over. After two hours of heating, the temperature was raised to 150° C. and held at that temperature for two hours, while continuing to collect methanol by distillation. At the end of the period, the heating was discontinued and a water aspirator vacuum was applied to the mixture to collect an additional amount of methanol and unreacted starting materials while the mixture cooled. Cooled to ambient temperature, the product di(dimethylaminoethyl) sebacate was isolated as a viscous brown liquid (49.3 g).

Preparation of Hydroxy Functional Polymer

A hydroxy functional polymer was prepared by initially charging a polymerization reactor equipped with a mechanical stirrer, a water cooled condenser, nitrogen inlet, water trap, thermometer, heating mantle and fluid matering pump with 172.5 parts of n-butyl acetate. The reaction vessel was heated to approximately 237° F. (114° C.) and a monomer premix composed of 96.2 parts of methyl methacrylate, 63.0 parts of butyl acrylate, 58 parts of hydroxyethyl methacrylate, 54 parts of styrene and an initiator premixture composed of 11.5 parts of n-butyl acetate and 5.7 parts of Vazo 67 was metered simultaneously into the polymerization reactor at a constant rate over approximately four hours. The reaction temperature was maintained for an additional two hours after the addition was completed and cooled for one hour. The resulting hydroxy functional polymer had a number average molecular weight of approximately 9,600.

Preparation of Curable Coating Composition:

The hydroxy functional polymer and the di(dimethylaminoethyl) sebacate crosslinker were mixed at 1:1 hydroxy/active ester equivalent ratio with 5% by weight of butyltin trishexanoate catalyst. Three samples of the mixture was drawn down on steel panels and baked at temperatures of 350°, 375° and 400° F. respectively for 20 minutes. The degree of cure was assessed by the number of Methyl Ethyl Ketone (MEK) double rubs needed to remove the film from the surface. The results are shown in Table 1.

COMPARATIVE EXAMPLE A

Three samples of the hydroxy functional polymer of Example 1 were mixed with 5% butyltin trishexanoate catalyst, and were also drawn down on steel panels and baked at temperatures of 350°, 375° and 400° F. respectively for 20 minutes. The degree of cure was assessed by the number of MEK double rubs needed to remove the film from the surface. The results are shown in Table 1.

COMPARATIVE EXAMPLE B

Three samples of the hydroxy functional polymer of Example 1 were mixed with 5% of benzyl dimethyl amine, and were also drawn down on steel panels and baked at temperatures of 350°, 375° and 400° F. respectively for 20 minutes. The degree of cure was assessed by the number of MEK double rubs needed to remove the film from the surface. The results are shown in Table 1.

TABLE 1

| Example | Number of MEK Double Rubs at 350° F. | 375° F. | 400° F. |
|---|---|---|---|
| 1 | 75 | 115 | 185 |
| A | 7 | 20 | 20 |
| B | 5 | 8 | 8 |

The invention claimed is:

1. A heat curable coating composition comprising:
(a) a polyester crosslinking agent having an average of at least two pendent

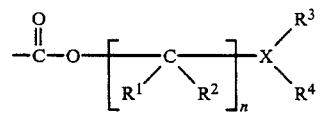

groups, wherein $R^1$ and $R^2$ are independently hydrogen, alkyl, substituted alkyl, or aryl groups; n is from about 1 to about 5; X is nitrogen, sulfur or phosphorus; and when X is nitrogen or phosphorus, $R^3$ is hydrogen, lower alkyl, or an aryl group; $R^4$ is lower alkyl or an aryl group; and when X is sulfur, $R^4$ is nothing and $R^3$ is either hydrogen, lower alkyl or aryl;
(b) a polymer having at least two hydroxy functional groups; and
(c) a catalytic amount of a transesterification catalyst.

2. The heat curable coating composition of claim 1 further comprising a ratio of active ester functionality to hydroxy functionality of between 10:1 and 1:10.

3. The heat curable coating composition of claim 2 wherein in said polyester crosslinking agent, X is nitrogen.

4. The heat curable coating composition of claim 3 wherein in said polyester crosslinking agent, $R^1$ and $R^2$ are independently hydrogen or methyl groups, n is from about 1 to about 3, $R^3$ is hydrogen, methyl or an ethyl group, and $R^4$ is methyl or an ethyl group.

5. The heat curable coating composition of claim 4 wherein said polyester crosslinking agent is selected from the group consisting of di(dimethylaminoethyl) sebacate, di(dimethylaminoethyl) azaleate, di(dimethylaminoethyl) tetrahydrophthalate and tris(dimethylaminoethyl) citrate.

6. The heat curable coating composition of claim 5 wherein the hydroxy functional polymer comprises the free radical addition polymerization product of at least one hydroxy functional monomer selected from the group consisting of 2-hydroxyethyl acrylate, 2-hydroxypropyl acrylate, 4-hydroxybutyl methacrylate, 2-hydroxypropyl methacrylate, 3-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, para-vinyl benzyl alcohol, and mixtures thereof with one or more ethylenically unsaturated monomers selected from the group consisting of styrene and methyl, ethyl, butyl, lauryl, isobornyl, 2-ethylhexyl, acrylates and methacrylates, and mixtures thereof.

7. The heat curable coating composition of claim 6 wherein the transesterification catalyst is selected from the group consisting of alkyltintriscarboxylate, dialkyltin oxide, tetralkyl titanate, lead carboxylate and zinc carboxylate.

8. The heat curable coating composition of claim 5 wherein the transesterification catalyst is selected from the group consisting of alkyltintriscarboxylate, dialkyltin oxide, tetralkyl titanate, lead carboxylate and zinc carboxylate.

9. The heat curable coating composition of claim 1 wherein the hydroxy functional polymer is selected from the group consisting of low molecular weight diols and polyols, hydroxy functional polyethers, hydroxy functional polyesters, hydroxy functional acrylics, hydroxy functional polyurethanes, hydroxy functional polycaprolactones, and mixtures thereof.

10. The heat curable coating composition of claim 9 wherein the hydroxy functional polymer comprises the free radical addition polymerization product of at least one hydroxy functional monomer selected from the group consisting of 2-hydroxyethyl acrylate, 2-hydroxypropyl acrylate, 4-hydroxybutyl methacrylate, 2-hydroxypropyl methacrylate, 3-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, para-vinyl benzyl alcohol, and mixtures thereof with one or more ethylenically unsaturated monomers selected from the group consisting of styrene and methyl, ethyl, butyl, lauryl, isobornyl, 2-ethylhexyl, acrylates and methacrylates, and mixtures thereof.

11. The heat curable coating composition of claim 10 wherein the transesterification catalyst is selected from the group consisting of alkyltintriscarboxylate, dialkyltin oxide, tetralkyl titanate, lead carboxylate and zinc carboxylate.

12. The heat curable coating composition of claim 1 wherein the transesterification catalyst is selected from the group consisting of alkyltintriscarboxylate, dialkyltin oxide, tetralkyl titanate, lead carboxylate and zinc carboxylate.

13. A method of electrocoating an electrically conductive surface serving as a cathode by passing an electrical current through an electrical circuit comprising said cathode, an anode, and an aqueous electrodepositable composition in contact with said cathode and said anode; wherein said electrodepositable composition comprises:

(a) a polyester crosslinking agent having an average of at least two pendent

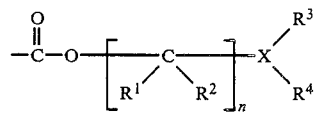

groups, wherein $R^1$ and $R^2$ are independently hydrogen, alkyl, substituted alkyl, or aryl groups; n is from about 1 to about 5; X is nitrogen, sulfur or phosphorus; and when X is nitrogen or phosphorus, $R^3$ is hydrogen, lower alkyl, or an aryl group; $R^4$ is lower alkyl or an aryl group; and when X is sulfur, $R^4$ is nothing and $R^3$ is either hydrogen, lower alkyl or aryl;

(b) a polymer having at least two hydroxy functional groups; and (c) a catalytic amount of a transesterification catalyst.

14. The method of electrocoating of claim 13 further comprising a ratio of active ester functionality to hydroxy functionality of between 10:1 and 1:10.

15. The method of electrocoating of claim 14 wherein in said polyester crosslinking agent, X is nitrogen.

16. The method of electrocoating of claim 15 wherein in said polyester crosslinking agent, $R^1$ and $R^2$ are independently hydrogen or methyl groups, n is from about 1 to about 3, $R^3$ is hydrogen, methyl or an ethyl group, and $R^4$ is methyl or an ethyl group.

17. The method of electrocoating of claim 16 wherein said polyester crosslinking agent is selected from the group consisting of di(dimethylaminoethyl) sebacate, di(dimethylaminoethyl) azaleate, and tris(dimethylaminoethyl) citrate.

18. The method of electrocoating of claim 17 wherein the hydroxy functional polymer comprises the free radical addition polymerization product of at least one hydroxy functional monomer selected from the group consisting of low molecular weight diols and polyols, hydroxy functional polyethers, hydroxy functional polyesters, hydroxy functional acrylics, hydroxy functional polyurethanes, hydroxy functional polycaprolactones, and mixtures thereof.

19. The method of electrocoating of claim 18 wherein the hydroxy functional polymer comprises the free radical addition polymerization product of at least one hydroxy functional monomer selected from the group consisting of 2-hydroxyethyl acrylate, 2-hydroxypropyl acrylate, 4-hydroxybutyl methacrylate, 2-hydroxypropyl methacrylate, 3-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, para-vinyl benzyl alcohol, and mixtures thereof with one or more ethylenically unsaturated monomers selected from the group consisting of styrene and methyl, ethyl, butyl, lauryl, isobornyl, 2-ethylhexyl, acrylates and methacrylates, and mixtures thereof.

20. The method of electrocoating of claim 19 wherein the transesterification catalyst is selected from the group consisting of alkyltintriscarboxylate, dialkyltin oxide, tetraalkyl titanate, lead carboxylate, and zinc carboxylate.

* * * * *